(No Model.)

F. A. WEGNER.
PNEUMATIC TIRE.

No. 514,796. Patented Feb. 13, 1894.

Witnesses.
Robert Everett
Thos. A. Green

Inventor.
Frederick A. Wegner.
By James L. Norris.
Atty.

THE NATIONAL LITHOGRAPHING COMPANY,
WASHINGTON, D. C.

UNITED STATES PATENT OFFICE.

FREDERICK A. WEGNER, OF THREE RIVERS, MICHIGAN, ASSIGNOR OF TWO-THIRDS TO CHARLES H. SAGE, JR., OF SAME PLACE, AND WILLIAM C. KEPLER, OF FLOWERFIELD, MICHIGAN.

PNEUMATIC TIRE.

SPECIFICATION forming part of Letters Patent No. 514,796, dated February 13, 1894.

Application filed October 12, 1893. Serial No. 487,982. (No model.)

*To all whom it may concern:*

Be it known that I, FREDERICK A. WEGNER, a citizen of the United States, residing at Three Rivers, in the county of St. Joseph and State of Michigan, have invented new and useful Improvements in Pneumatic Tires, of which the following is a specification.

This invention relates to pneumatic or air-cushion tires particularly designed for bicycles, but useful for the wheels of sulkies and other vehicles of any character.

The object of my invention is to improve and render more durable and effective the unwoven fibrous armor described in my application for Letters-Patent filed July 10, 1893, Serial No. 480,055.

To accomplish this object my invention consists essentially in an armor for a pneumatic or air-cushion tire composed of an unwoven fibrous material having incorporated therewith a binding substance composed of powdered alum, resin, and gutta-percha, and distributed substantially throughout the mass of unwoven fibrous material.

The invention is illustrated by the accompanying drawings, in which—

Figure 1:
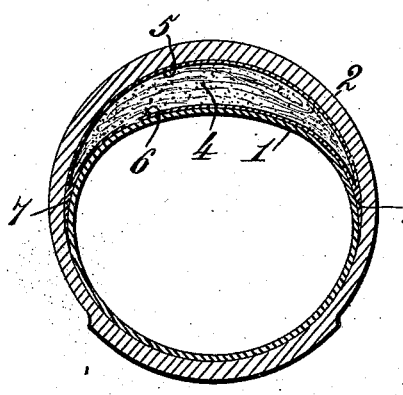
Figure 2:
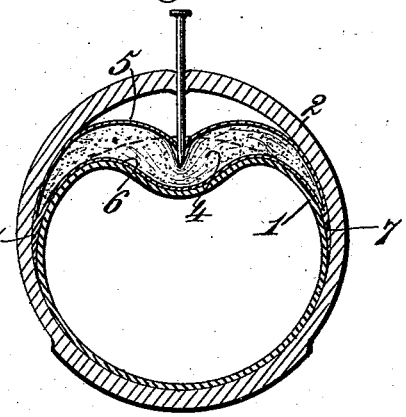

Figure 1 is a transverse sectional view on an enlarged scale of a wheel tire constructed in accordance with my invention; and Fig. 2 is a similar view, showing the manner in which the armor yields if a sharp object penetrates the external casing.

In order to enable those skilled in the art to make and use my invention, I will now describe the same in detail, referring to the drawings, wherein the pneumatic or air-cushion tire is shown as composed of an inner air tube 1, and an outer casing 2 adapted to rest against the rim of a wheel, which may be a bicycle, sulky, or any other wheel for a vehicle.

The external casing may be composed of a canvas foundation surfaced with india-rubber, or it may be of any other desired material and construction which will fulfill the conditions required in this class of tires, and the internal air tube may be made of india-rubber, or its compounds, or any other material, so that it is susceptible of being inflated with air and of yielding while traversing the roadway.

To protect the internal air tube from the damage or injury incident to being perforated by a nail, tack, piece of glass, stone, or any other sharp object which may penetrate the external casing, I provide an armor 4, composed of a body of raw cotton, or other unwoven fiber, such as silk filaments, or a mixture of raw cotton and silk filaments with which is incorporated a chemical binding substance, composed of powdered alum, one part, powdered resin, one part, and powdered gutta-percha, one part, all mixed together and distributed substantially throughout the body of unwoven fibrous material, by sprinkling or dusting the powdered substance upon the latter.

I have found that resin alone is objectionable, in that if the tire is exposed to the sun, or is set near a fire, the resin melts, and subsequently cooling and hardening makes a hard substance which impairs the efficiency of the tire, and is disadvantageous. This objection I avoid by making the binding substance of a compound composed of about one part of powdered alum; one part of powdered resin, and one part of powdered gutta-percha, or its equivalent.

The armor made as described is interposed between the external casing and the internal air tube, and it may extend entirely around the air tube, so as to incase the same, or it may have a crescent shape in cross section and only extend partially around the air tube, as shown in the drawings. The body of the unwoven fiber is flexible and adapted to yield inwardly, but the binding substance described renders the armor so tough and difficult of penetration that if the tire encounters a sharp object, the latter cannot penetrate the body of unwoven fiber, and consequently the air tube is perfectly protected from all damage or injury, which would necessarily result if the sharp object passed through the external casing and penetrated the air tube. The unwoven body of fiber is preferably placed in a pocket or case composed of two layers 5 and 6 of any suitable fabric, such as thin rubber, the longitudinal edges of which are vulcanized together, as at 7. The pocket or case containing the unwoven body of fiber is inserted into the tire between the inner tube 1 and the outer casing 2.

I have discovered that by the employment of a powdered chemical substance, such as powdered alum, resin, and gutta-percha distributed substantially throughout the mass of fibrous material, it is impossible to pass a very sharp instrument, like a needle, through the armor, and in this respect the improvement is very advantageous over unwoven fibrous material when used alone, as in my application for patent alluded to.

Having thus described my invention, what I claim is—

An armor for a pneumatic or air cushion tire, consisting of unwoven fibrous material having incorporated therewith a compound composed of powdered alum, powdered resin, and powdered guttapercha, mixed together in about the proportions set forth for the purpose specified.

In testimony whereof I have hereunto set my hand in presence of two subscribing witnesses.

FRED. A. WEGNER.

Witnesses:
ALBERT H. NORRIS,
THOS. A. GREEN.